(12) United States Patent
Ross et al.

(10) Patent No.: US 12,403,943 B2
(45) Date of Patent: Sep. 2, 2025

(54) SYSTEM AND METHOD FOR CONTROLLING A TRAIN TRAVELLING ALONG A RAILWAY LINE

(71) Applicant: KB Signaling Inc., West Henrietta, NY (US)

(72) Inventors: John Ross, Melbourne, FL (US); Jeffrey Fries, Grain Valley, MO (US); Maximo Salinas, Melbourne, FL (US); Shawn Clark, Melbourne, FL (US); Jess Backes, Grain Valley, MO (US); Michael Scott Mitchell, Grain Valley, MO (US)

( * ) Notice: Subject to any disclaimer, the term of this patent is extended or adjusted under 35 U.S.C. 154(b) by 786 days.

(21) Appl. No.: 17/660,557

(22) Filed: Apr. 25, 2022

(65) Prior Publication Data

US 2023/0339525 A1 Oct. 26, 2023

(51) Int. Cl.
| | |
|---|---|
| *B61L 23/16* | (2006.01) |
| *B61L 13/00* | (2006.01) |
| *B61L 15/00* | (2006.01) |
| *B61L 25/02* | (2006.01) |
| *H04L 67/12* | (2022.01) |

(52) U.S. Cl.
CPC ............ *B61L 23/16* (2013.01); *B61L 13/002* (2013.01); *B61L 15/0018* (2013.01); *B61L 25/025* (2013.01); *H04L 67/12* (2013.01); *B61L 2205/00* (2013.01)

(58) Field of Classification Search
CPC .... B61L 23/16; B61L 13/002; B61L 15/0018; B61L 25/025; B61L 2205/00; H04L 67/12
See application file for complete search history.

(56) References Cited

U.S. PATENT DOCUMENTS

| | | | |
|---|---|---|---|
| 11,014,588 B2 * | 5/2021 | Saxena | ................ B61L 23/042 |
| 11,349,589 B2 * | 5/2022 | Carlson | ............... B61L 15/0058 |
| 11,577,763 B2 * | 2/2023 | Mijatovic | .............. G08G 1/123 |

(Continued)

FOREIGN PATENT DOCUMENTS

| | | | | |
|---|---|---|---|---|
| CN | 118790322 A | * | 10/2024 | |
| DE | 60213747 T2 | * | 9/2007 | .......... B61L 27/0038 |
| EP | 2090491 A1 | * | 8/2009 | .............. B61L 1/188 |

*Primary Examiner* — Jason C Smith
(74) *Attorney, Agent, or Firm* — David L. Nocilly; Bond Schoeneck & King PLLC

(57) ABSTRACT

A system and method are for controlling a train traveling along track blocks. A first signal transmitter is installed at a first track block and transmits, using a predefined range of transmission frequencies, first signals for detecting when the train enters the first track block. A second signal transmitter is installed at an adjacent second track block and transmits, using a predefined range of transmission frequencies different from the predefined range of transmission frequencies used by the first signal transmitter, second signals for detecting when the train enters the second track block. One or more signal receivers on board of the train are configured to receive the transmitted first and second signals, and an onboard controller is configured, based on signals supplied by the one or more receivers indicative of the first and second signals received, to identify when the train enters the first or second track blocks.

19 Claims, 2 Drawing Sheets

(56) References Cited

U.S. PATENT DOCUMENTS

| | | | |
|---|---|---|---|
| 11,780,482 B2* | 10/2023 | Mijatovic | B61L 1/185 246/473 R |
| 2010/0004804 A1* | 1/2010 | Anderson | B61K 9/08 701/19 |
| 2020/0189632 A1* | 6/2020 | Saxena | B61L 23/007 |
| 2023/0339525 A1* | 10/2023 | Ross | B61L 23/14 |

* cited by examiner

SYSTEM AND METHOD FOR CONTROLLING A TRAIN TRAVELLING ALONG A RAILWAY LINE

FIELD OF THE INVENTION

The present invention relates to a system and a method for controlling a train travelling along a railway line.

BACKGROUND OF THE INVENTION

As known, a proper monitoring of trains traveling along a railway line, and in particular the detection of their actual position, is of outmost importance for ensuring the safe and efficient operation of each train and of the whole railway network as well.

In particular, from an operative point of view, a railway line is usually segmented in a plurality of subsequent track blocks and signals are transmitted by means of trackside devices to each train entering a new track block, for example to communicate movement authorities.

In this way, each train can receive information in particular about the speed limit or speed profile to be respected within each block or part thereof, which information is of course of primary importance for traffic management.

Although current solutions allow to fulfill such need in a quite satisfying way, they still have some aspects worth of further improvements.

In particular, along a block of a railway line, according to a current solution, a wayside device places one of a small number of possible codes onto the tracks by injecting signals which are inductively received by the train, usually via inductive coils placed in the undercarriage thereof.

Each of the codes received via such signals is properly processed by the onboard control system of the train to identify the assigned movement authority, i.e. a speed limit and/or any operating mode restriction, which applies in the relevant track block until a new code is received. Since there is no communication from the train to the wayside device, the code typically persists while the train is occupying that track block.

One drawback of these known solutions resides in the fact that current systems generally do not know the exact moment when a train enters a new block, due to delays in receiving and qualifying the signal onboard and because the same signal may be frequently used over several adjacent track blocks.

For example, it is possible that a train has travelled a certain distance inside a block before it receives and properly processes the signals relative to that specific block.

This uncertainty about the precise location of a train when entering a block must be accounted for in the safe braking design of the system, which means that relevant speed restrictions could be applied conservatively too soon or, conversely, speed upgrades might be applied too late for evident safety reasons.

As a consequence, the travel profile of the train within track blocks is not effectively optimized, since for instance the opportunity to modify the actual speed of the train in relation to the actual position of the train and the actual conditions of each section within the blocks is not pursued, e.g. to gain traffic capacity and/or to reduce trip times.

SUMMARY OF THE DESCRIPTION

Hence, it is evident that there is room and desire for improvements in the way trains travelling along railway line are properly controlled.

The present disclosure is aimed at providing a solution to this end and, in one aspect, it provides a system for controlling a train travelling along a plurality of track blocks of a railway line, the system comprising at least:
  at least one first signal transmitter which is installed at a first track block of the plurality of track blocks, the at least one first signal transmitter being configured to transmit, using a predefined range of transmission frequencies, first signals suitable to allow detecting when the train enters into the first track block;
  at least one second signal transmitter which is installed at a second track block of the plurality of track blocks adjacent to the first track block, the at least one second signal transmitter being configured to transmit, using a predefined range of transmission frequencies different from the predefined range of transmission frequencies used by the at least one first signal transmitter, second signals suitable to allow detecting when the train enters into the second track block;
  one or more signal receivers which are installed on board of the train and are configured to receive the transmitted first and second signals; and
  a controller which is installed onboard of the train and is configured, based on signals supplied by said one or more receiver, indicative of the first and second signals received, to identify when the train enters the first track block or the second track block;

In another aspect, the present disclosure provides a method for controlling a train travelling along a plurality of track blocks of a railway line, comprising at least:
  transmitting, by means of at least one first signal transmitter installed at a first track block of the plurality of track blocks, using a predefined range of transmission frequencies, first signals suitable to allow detecting when the train enters the first track block;
  transmitting, by means of at least one second signal transmitter installed at a second track block of the plurality of track blocks adjacent to the first track block, using a predefined range of transmission frequencies different from the predefined range of transmission frequencies used by the at least one first signal transmitter, second signals suitable to allow detecting when the train enters into the second track block;
  receiving, by one or more signal receivers installed on board of the train, the transmitted first and second signals; and
  identifying, by means of a controller installed onboard of the train and based on signals supplied by the one or more receivers indicative of the first and second signals received, when the train enters the first track block or the second track block.

BRIEF DESCRIPTION OF THE DRAWINGS

Detailed characteristics and advantages will become apparent from the description of some preferred but not exclusive exemplary embodiments of a system and a method according to the present disclosure, illustrated only by way of non-limitative examples with the accompanying drawings, wherein.

DETAILED DESCRIPTION

Figure 1:
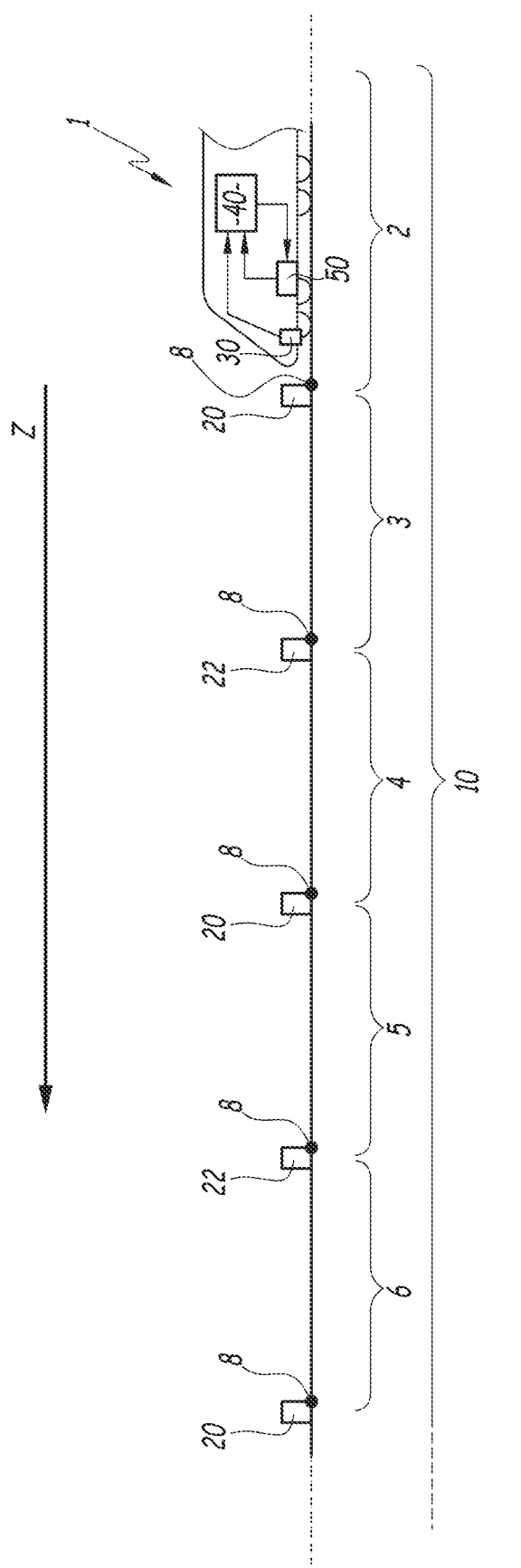
FIG. 1 schematically illustrates various components of a system for controlling a train travelling along a railway line according to the present disclosure.

It should be noted that in the detailed description that follows, identical or similar components, either from a structural and/or functional point of view, may have the same reference numerals, regardless of whether they are shown in different embodiments of the present disclosure. It should be also noted that in order to clearly and concisely describe the present disclosure, the drawings may not necessarily be to scale and certain features of the disclosure may be shown in somewhat schematic form.

Further, when the term "adapted" or "arranged" or "configured" or "shaped", or "set", or any similar term is used herein while referring to any component as a whole, or to any part of a component, or to a combination of components, it has to be understood that it means and encompasses correspondingly either the structure, and/or configuration and/or form and/or positioning. In particular, for electronic and/or software means, each of the above listed terms means and encompasses electronic circuits or parts thereof, as well as stored, embedded or running software codes and/or routines, algorithms, or complete programs, suitably designed for achieving the technical result and/or the functional performances for which such means are devised.

In particular, for electronic and/or software means, each of the above listed terms means and encompasses electronic circuits or parts thereof, as well as stored, embedded or running software codes and/or routines, algorithms, or complete programs, suitably designed for achieving the technical result and/or the functional performances for which such means are devised.

Finally, in the following description and claims, the numeral ordinals first, second, et cetera . . . , will be used primarily for the sake of clarity of description and in no way they should be understood as limiting for whatsoever reason; in particular, the indication of a component referred to for instance as the "third . . . " does not imply necessarily the presence or strict need of the preceding "first" or "second" ones in each and any embodiment, unless such presence is clearly evident for the correct functioning of the specific embodiment(s) disclosed, nor that the order should be the one described in the illustrated specific exemplary embodiment(s).

FIG. 1 schematically illustrates components of system for controlling a train travelling along a plurality of track blocks of a railway line, according to the present disclosure.

In particular, in FIG. 1 a train is schematically represented just by a part of a single railway unit, and therein indicated by the reference number 1. The train 1 travels for example in the direction indicated by the arrow Z along a railway line 10. Further, in FIG. 1 there are illustrated only five track blocks 2, 3, 4, 5 and 6 of the railway line 10.

Clearly, depending on the applications, the railway line 10 can be segmented in or comprise any suitable number of track blocks, each of them having any suitable length, and the train 1 can be of any suitable type and composed by any suitable number or cars or units.

As illustrated in FIG. 1, the system for controlling the travelling train 1 comprises at least:
- at least one first signal transmitter, schematically indicated by the reference number 20, which is installed at a track block 3, e.g. conveniently at the boundary between a track block 2 and a track block 3 (for the sake of ease of description the track block 3 is hereinafter referred to as "the first track block 3") of the plurality of track blocks, the at least one first signal transmitter 20 being configured to transmit, using a predefined range of transmission frequencies, first signals suitable to allow detecting when the train 1 enters into the first track block 3;
- at least one second signal transmitter, schematically indicated by the reference number 22, which is installed at a track block 4, (hereinafter "the second track block 4") of the plurality of track blocks adjacent to the first track block 3, the at least one second signal transmitter 22 being configured to transmit, using a predefined range of transmission frequencies different from the predefined range of transmission frequencies used by the at least one first signal transmitter 20, second signals suitable to allow detecting when the train 1 enters into the second track block 4;
- one or more signal receivers, one of which is schematically indicated in FIG. 1 by the reference number 30, which are installed on board of the train 1 and are configured to receive the transmitted first and second signals by the first and second transmitters 20 and 22, respectively;
- a controller, schematically indicated in FIG. 1 by the reference number 40, which is installed onboard of the train 1 and is configured, based on signals supplied to it by the one or more receivers 30, indicative of the first and second signals received, to identify when the train 1 enters either the first track block 3 or the second track block 4.

In FIG. 1, the second track block 4 is for example the track block adjacent to the first track block 3 located downwardly along the railway line 10 with respect to the travelling direction Z of the train 1 and, for instance, as illustrated in the exemplary embodiment of FIG. 1, the second signal transmitter 22 is positioned at boundary between the first track block 3 and the second track block 4.

The or each of the one or more receivers 30 can comprise or be constituted by pickup coils installed for example at associated wheel axles of the train 1. The or each pickup coil 30 is configured to inductively capture the first and second signals transmitted over the rails of the railway line 10.

The controller 40 may include or be constituted by any processor-based device; e.g. a microprocessor, a microcontroller, a microcomputer, a programmable logic controller, an application specific integrated circuit, or any other programmable circuit. Therefore, the term processor, as used herein, is not limited to just those integrated circuits referred to in the art as computers, but broadly refers to microprocessors, microcontrollers, microcomputers, programmable logic controllers, application specific integrated circuits, and other programmable circuits, and these terms are used interchangeably herein. Further, the controller 40 may include or be associated with any needed circuitry and/or software code suitable for performing the functionalities and tasks devised to be carried out by the controller within the frame of the system according to the present disclosure.

In one possible embodiment, the at least one first signal transmitter 20 is configured to transmit the first signals using either a first range of frequencies or alternatively a second range of frequencies set as its predefined range of transmission frequencies.

Likewise, the at least one second signal transmitter 22 is configured to transmit the second signals using either a first range of frequencies or alternatively a second range of frequencies set as its predefined range of transmission frequencies.

In particular, the at least one first signal transmitter 20 is arranged to be selectively configurable to set, for example manually, one of the first and second ranges of frequencies to be used as its predefined range of transmission frequencies for transmitting the first signals, whereas the second signal transmitter 22 is arranged to be selectively configurable to set, for example manually, the other one of the first and second ranges of frequencies to be used as its predefined range of transmission frequencies for transmitting the second signals.

The first and second ranges of frequencies can be selected according to the applications. For example the first range of frequencies can be comprised between 61 to 72 Hz and the second range of frequencies can be comprised between 73 and 84 Hz.

In one possible embodiment, the controller 40 is configured to identify when the train 1 enters the first track block 3 or the second track block 4 based on the amplitude of the first and second signals transmitted by the at least one first and second signal transmitters, respectively, and conveyed to the controller 40 itself via the one or more receivers 30.

In one possible embodiment, the at least one first and second signal transmitters 20 and 22 are both arranged to transmit to the controller 40 further signals (hereinafter "third signals"), in particular digital signals, carrying predefined data packets by using a further predefined range of transmission frequencies different from the predefined range of transmission frequencies used for transmitting the respective first and second signals.

For example, the further range of frequencies can be lower than the first and second range of frequencies, and for instance comprised between 40 and 59 Hz.

In one possible embodiment, the predefined data packets transmitted to the controller 40 comprise information selectively identifying the first track block 3 or the second track block 4. Such information may be constituted or comprise a respective ID code of the first or the second track blocks 3, 4.

According to this possible embodiment, the controller 40 is further configured to verify if the information received via the third signals is consistent with the first track block 3 or the second block 4 identified by the controller itself as the block being entered by the train 1, based on the first and/or second signals transmitted.

In practice, the controller 40 verifies if the information received, for instance the ID code, corresponds to the first track block 3 or to the second track block 4 identified as being entered by the train 1; thus, in case of discrepancy, the controller 40 may take the appropriate safety reaction (for example, slow down the train, alert the driver, et cetera).

In addition to the ID code, the third signals can include other data and/or information, such as the length of the relevant track block, presence of work zones along the track block, data related to the direction of traffic, speed restrictions through any curves or level crossings, and/or diagnostic information about equipment installed in the relevant block, and/or maintenance alarms, such as failed signal lamp or loss of power, et cetera.

According to a possible embodiment, the system according to the present disclosure further comprises at least one module, in particular a software module or at least a module containing software code, schematically represented in FIG. 1 by the box 50, which is run by the controller 40 itself and is reinitialized when it is identified that the train 1 is crossing the boundary between two adjacent blocks, and thus is entering into a new track block, such as the first track block 3 or the second track block 4.

In particular, the at least one module 50 is configured, once initialized, and based on data provided for example by tachometers, to track the actual position of the train 1 along the identified track block, e.g. the first track block 3 or the second track block 4, and the distance travelled is then reset back to zero each time a transition from one block to an adjacent one is detected.

According to this embodiment, the controller 40 is further configured to validate the initialization of the at least one software module 50 if the information received via the third signals selectively identifying the first track block 3 or the second track block 4 is consistent with the first track block 3 or the second track block 4 identified by the controller as the track block being entered by the train 1, via the first and/or second signals.

In one possible embodiment, the at least one first signal transmitter 20 comprises a first plurality of first signal transmitters 20, and the at least one second signal transmitter 22 comprises a second plurality of second signal transmitters 22, wherein, as schematically illustrated in FIG. 1, the first and second signal transmitters 20, 22 are installed each along a corresponding track block of the plurality of blocks in an alternate sequence among them.

Hence, as depicted in FIG. 1 where only four transmitters are illustrated for ease of illustration, along the railway line 10, each first transmitter 20, assigned to a track block and transmitting the first signals using for instance the first range of transmission frequencies, is followed (and also preceded) by a second signal transmitter 22 assigned to the adjacent track blocks and transmitting the second signals using for instance the second range of transmission frequencies, or vice versa. If instead each first transmitter 20 is set to use the second range of transmission frequencies, then each second transmitter is set to use the first range of transmission frequencies.

Clearly, depending on the application, the number of first and second transmitters installed along the railway line 10 and assigned each to a respective track block, can be any suitable one, and what above described for the first transmitter 20 and the second transmitter 22 applies likewise to all installed first and second transmitters 20, 22.

In one possible embodiment, the at least one or each of the first and second signal transmitters 20, 22 are configured to transmit continuously the respective first and second signals over the rails of the railway line 10.

According to yet another possible embodiment, the at least one or each of the first and second signal transmitters 20, 22 is placed at a corresponding insulated joint, schematically indicated in FIG. 1 by the reference number 8, which is positioned between two adjacent track blocks of the plurality of track blocks.

In yet another possible embodiment, the at least one or each of the first and second signal transmitters 20, 22 are configured to transmit periodically. e.g. every 3-6 seconds, the third signals over the rails of the railway line 10.

Figure 2:
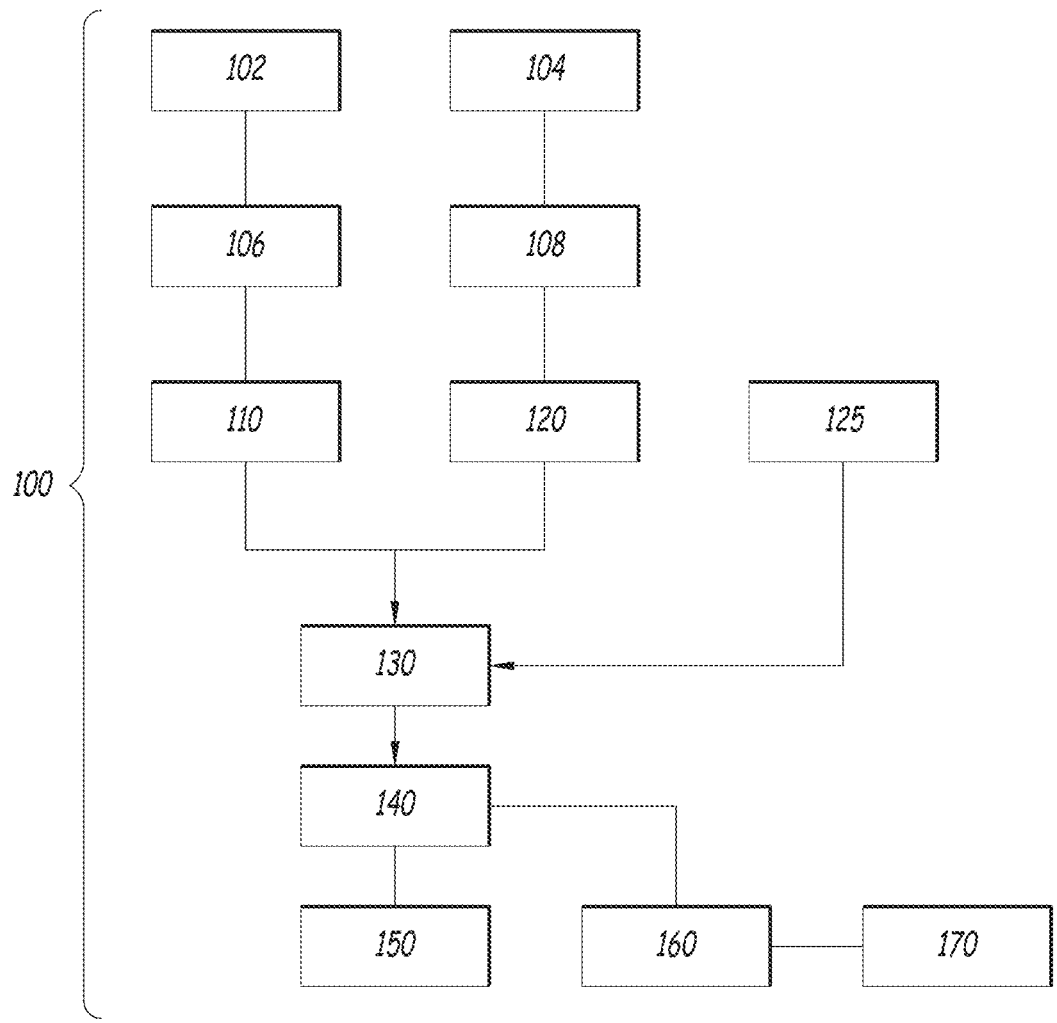
FIG. 2 is a flowchart schematically illustrating a method for controlling a train travelling along a railway line according to the present disclosure.

FIG. 2 illustrates a method 100 for controlling a train 1 travelling along a plurality of track blocks 2, 3, 4, 5, 6 et cetera, of a railway line 10, comprising at least:
110: transmitting, by means of at least one first signal transmitter 20, installed at a first track block 3 of the plurality of track blocks, using a predefined range of transmission frequencies, first signals suitable to allow detecting when the train 1 enters the first track block 3;
120: transmitting, by means of at least one second signal transmitter 22, installed at a second track block 4 of the plurality of track blocks adjacent to the first track block 3, using a predefined range of transmission frequencies different from the predefined range of transmission frequencies used by the at least one first signal transmitter 20, second signals suitable to allow detecting when the train 1 enters into the second track block 4;

130: receiving, by one or more signal receivers 30 installed on board of the train 1, the transmitted first and second signals; and 140: identifying, by means of a controller 40 installed onboard of the train 1 and based on signals supplied by the one or more receivers 30 indicative of the first and second signals received, when the train 1 enters the first track block 3 or the second track block 4.

As a person skilled in the art would readily appreciate, the phases of transmitting 110 and 120 can be executed simultaneously to each other or in whatever order.

In one possible embodiment, the method 100 comprises, before the phases of transmitting 110 and 120:

102: preconfiguring the at least one first signal transmitter 20 to transmit the first signals using a first range of frequencies or alternatively a second range of frequencies settable as its predefined range of transmission frequencies;

104: preconfiguring the at least one second signal transmitter 22 to transmit the second signals using a first range of frequencies or alternatively a second range of frequencies settable as its predefined range of transmission frequencies;

106: setting, in the at least one first signal transmitter 20, one of the first and second ranges of frequencies to be used as its predefined range of transmission frequencies for transmitting the first signals; and 108: setting, in the at least one second signal transmitter 22, the other one of the first and second ranges of frequencies to be used as its predefined range of transmission frequencies for transmitting the second signals.

As a person skilled in the art would readily appreciate, the phases of preconfiguring 102 and 104 can be executed simultaneously to each other or in whatever order; likewise also the phases of setting 106 and 108 can be executed simultaneously to each other or in whatever order.

In one possible embodiment the method 100 further comprises:

125: transmitting to the controller 40, by means of both the at least one first and second signal transmitters 20, 22, third signals (as above described in connection with the system). e.g. digital signals, carrying predefined data packets by using a further predefined range of transmission frequencies different from the predefined range of transmission frequencies used for transmitting the first and second signals.

In particular, as above indicated in connection with the described system, the predefined data packets transmitted to the controller comprise information selectively indicative of the first track block 3 and of the second track block 4, and the method comprises:

150: verifying, by means of the controller 40, if the information received via the further signals is consistent with the first track block 3 or the second block 4 identified as the track block being entered by the train 1 based on the first and/or second signals.

In one possible embodiment, the method 100 further comprises, when identifying that the train 1 is entering the first track block 3 or the second track block 4, i.e. the train is crossing a boundary between two adjacent blocks:

160: initializing at least one software module 50 installed on board of the train 1, the at least one software module 50 being configured, once initialized, to track the actual position of the train 1 along the identified first or second track blocks 3, 4.

In yet a further possible embodiment, the method 100 further comprises:

170: validating, by means of the controller 40, the initialization of the at least one software 50 if the information received via the third signals, selectively indicative of the first track block 3 or the second track block 4 is consistent with the first track block 3 or the second track block 4 identified as the track block being entered by the train 1 based on the first and/or second signals received.

In practice, according to the system and method 100 of the present disclosure, while a train advances from a track block towards the next one, the amplitudes of the first and second signals captured by the at least one device 30 vary, one diminishing while the other increasing. At the boundary between two adjacent blocks, the signal transmitted within one of the two selected ranges, i.e. that related to the track block the train is leaving, has its maximum amplitude, while the signal transmitted within the other one of the two selected ranges, i.e. that related to the track block the train is entering into, has its amplitude very low or substantially equal to zero. These fluctuations of the first and second signals repeat recursively block after block.

In this way, the controller 40 identifies immediately the instant when a train starts traversing a boundary between two adjacent track blocks and enters into a new track block.

Hence, it is evident that the system and method 100 according to the present disclosure enable to properly control trains travelling along a railway line, identifying exactly the moment when a train enters a new track block. In this way, it is possible, inter alia, for example to timely apply movement authorities valid for the track block just entered.

The system and method 100 thus conceived are susceptible of modifications and variations, all of which are within the scope of the inventive concept as defined in particular by the appended claims; for example, the ranges or bands selected for transmitting the first and second signals, and in case also the third signals, can be different from those previously indicated. All the details may furthermore be replaced with technically equivalent elements.

What is claimed is:

1. A system for controlling a train travelling along a plurality of track blocks of a railway line, the system comprising at least:

at least one first signal transmitter which is installed at a first track block of the plurality of track blocks, the at least one first signal transmitter being configured to transmit, using a predefined range of transmission frequencies, first signals suitable to allow detecting when the train enters into the first track block;

at least one second signal transmitter which is installed at a second track block of the plurality of track blocks adjacent to the first track block, the at least one second signal transmitter being configured to transmit, using a predefined range of transmission frequencies different from the predefined range of transmission frequencies used by the at least one first signal transmitter, second signals suitable to allow detecting when the train enters into the second track block;

one or more signal receivers which are installed on board of the train and are configured to receive the transmitted first and second signals; and a controller which is installed onboard of the train and is configured, based on signals supplied by said one or more receivers indicative of the first and second signals received, to identify when the train enters the first track block or the second track block.

2. The system according to claim 1, wherein the at least one first signal transmitter is configured to transmit the first signals using a first range of frequencies or alternatively a second range of frequencies set as its predefined range of transmission frequencies.

3. The system according to claim 2, wherein the at least one second signal transmitter is configured to transmit the second signals using the first range of frequencies or alternatively the second range of frequencies set as its predefined range of transmission frequencies.

4. The system according to claim 3, wherein the at least one first signal transmitter is arranged to be selectively configurable to set one of the first and second ranges of frequencies to be used as its predefined range of transmission frequencies for transmitting the first signals, and the second signal transmitter is arranged to be selectively configurable to set the other one of the first and second ranges of frequencies to be used as its predefined range of transmission frequencies for transmitting the second signals.

5. The system according to claim 1, wherein the controller is configured to identify when the train enters the first track block or the second track block based on the relative changes in amplitude of the first and second signals transmitted by the at least one first and second signal transmitters, respectively.

6. The system according to claim 1, wherein the at least one first and second signal transmitters are both arranged to transmit to the controller third signals carrying predefined data packets by using a further predefined range of transmission frequencies different from the predefined range of transmission frequencies used for transmitting the first and second signals.

7. The system according to claim 6, wherein said predefined data packets transmitted to the controller comprise information selectively indicative of the first track block and of the second track block, and wherein the controller is further configured to verify if the information received via the third signals is consistent with the first track block or the second track block identified as the track block being entered by the train based on the first and/or second signals received.

8. The system according to claim 6, wherein it comprises at least one software module which is configured to be initialized by the controller when identifying that the train is entering the first track block or the second track block, the at least one software module being configured, once initialized, to track the actual position of the train along the identified first or second track blocks, and wherein the controller is further configured to validate the initialization of the at least one software module if the information received via the third signals, selectively indicative of the first track block or the second track block is consistent with the first track block or the second track block identified as the track block being entered by the train based on the first and/or second signals received.

9. The system according to claim 6, wherein said at least one first and second signal transmitters are configured both to transmit periodically said third signals to said train over the rails of the railway line.

10. The system according to claim 1, wherein it comprises at least one software module which is configured to be initialized by the controller when identifying that the train is entering the first track block or the second track block, the at least one software module being configured, once initialized, to track the actual position of the train along the identified first or second track blocks.

11. The system according to claim 1, wherein the at least one first signal transmitter comprises a plurality of first signal transmitters, and the at least one second signal transmitter comprises a plurality of second signal transmitters, and wherein the first and second signal transmitters are installed each along a corresponding track block of the plurality of blocks in an alternate sequence among them.

12. The system according to claim 11, wherein the at least one or each of the first and second signal transmitters are configured to transmit continuously the respective first and second signals over the rails of the railway line.

13. The system according to claim 11, wherein the at least one or each of the first and second signal transmitters is placed at an insulated joint positioned between two adjacent track blocks of the plurality of track blocks.

14. A method for controlling a train travelling along a plurality of track blocks of a railway line, comprising at least:
transmitting, by means of at least one first signal transmitter installed at a first track block of the plurality of track blocks, using a predefined range of transmission frequencies, first signals suitable to allow detecting when the train enters the first track block;
transmitting, by means of at least one second signal transmitter installed at a second track block of the plurality of track blocks adjacent to the first track block, using a predefined range of transmission frequencies different from the predefined range of transmission frequencies used by the at least one first signal transmitter, second signals suitable to allow detecting when the train enters into the second track block;
receiving, by one or more signal receivers installed on board of the train, the transmitted first and second signals; and
identifying, by means of a controller installed onboard of the train and based on signals supplied by the one or more receivers indicative of the first and second signals received, when the train enters the first track block or the second track block.

15. The method according to claim 14, wherein it further comprises:
configuring the at least one first signal transmitter to transmit the first signals using a first range of frequencies or alternatively a second range of frequencies settable as its predefined range of transmission frequencies;
configuring the at least one second signal transmitter to transmit the second signals using the first range of frequencies or alternatively the second range of frequencies settable as its predefined range of transmission frequencies;
setting, in the at least one first signal transmitter, one of the first and second ranges of frequencies to be used as its predefined range of transmission frequencies for transmitting the first signals; and
setting, in the at least one second signal transmitter, the other one of the first and second ranges of frequencies to be used as its predefined range of transmission frequencies for transmitting the second signals.

16. The method according to claim 14, wherein it further comprises:
transmitting to the controller, by means of both the at least one first and second signal transmitters, third signals carrying predefined data packets by using a further predefined range of transmission frequencies different from the predefined range of transmission frequencies used for transmitting the first and second signals.

17. The method according to claim 16, wherein said predefined data packets transmitted to the controller comprise information selectively indicative of the first track block and of the second track block, and wherein the method comprises verifying, by means of the controller, if the information received via the third signals is consistent with the first track block or the second track block identified as the track block being entered by the train based on the first and/or second signals received.

18. The method according to claim 16, further comprising, when identifying that the train is entering the first track block or the second track block, initializing at least one software module installed on board of the train, the at least one software being configured, once initialized, to track the actual position of the train along the identified first or second track blocks, and further comprising validating, by means of the controller, the initialization of the at least one software module if the information received via the third signals, selectively indicative of the first track block or the second track block is consistent with the first track block or the second track block identified as the track block being entered by the train based on the first and/or second signals received.

19. The method according to claim 14, further comprising, when identifying that the train is entering the first track block or the second track block, initializing at least one software module installed on board of the train, the at least one software being configured, once initialized, to track the actual position of the train along the identified first or second track blocks.

* * * * *